May 6, 1969

F. F. LIU 3,442,135

DEVICE FOR MEASUREMENT OF GAS PROPERTIES AND GAS FLOW RATE

Filed Feb. 9, 1967

FREDERICK F. LIU
INVENTOR.

BY R. E. Geauque
ATTORNEY

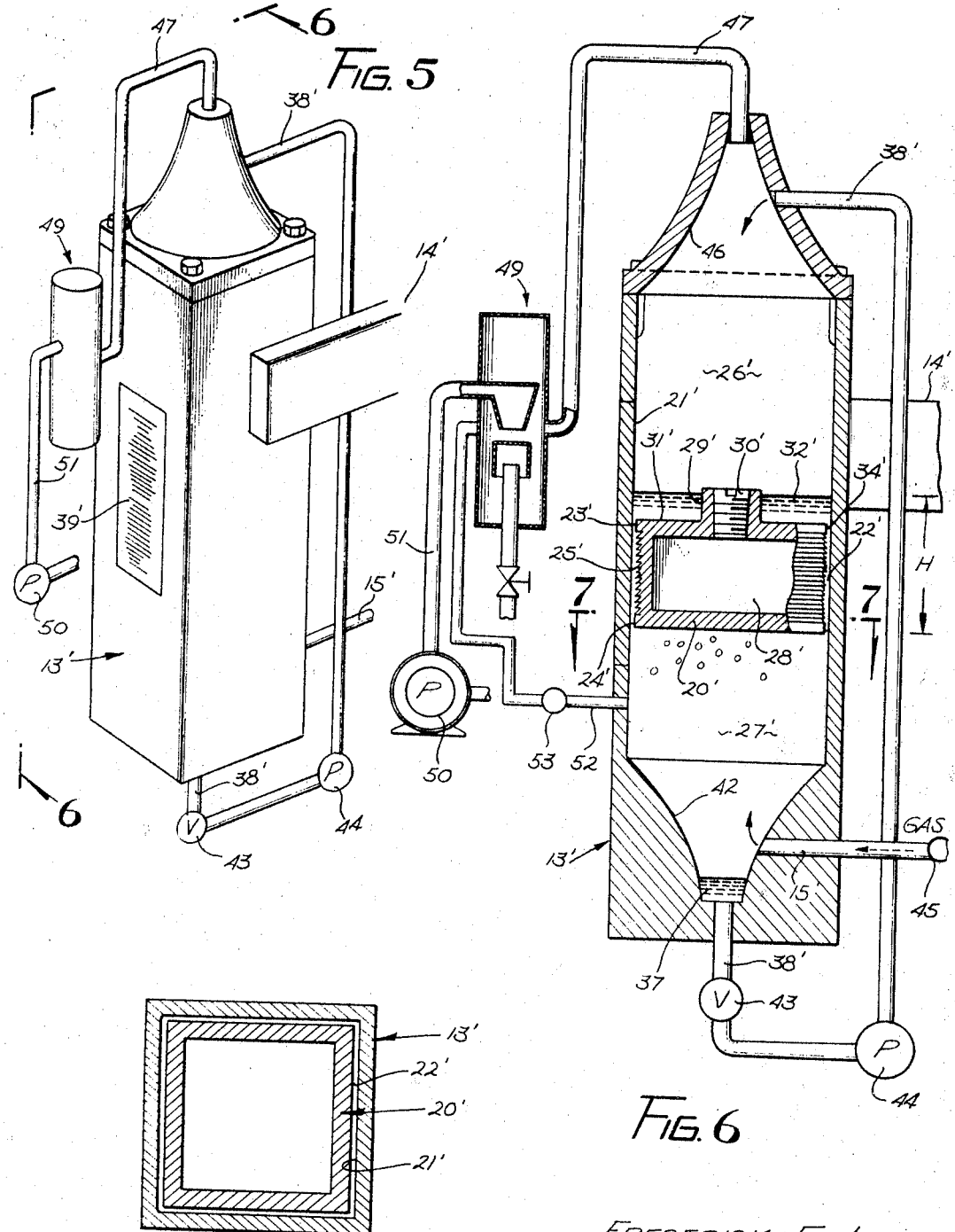

May 6, 1969
F. F. LIU
3,442,135
DEVICE FOR MEASUREMENT OF GAS PROPERTIES AND GAS FLOW RATE
Filed Feb. 9, 1967
Sheet 3 of 3
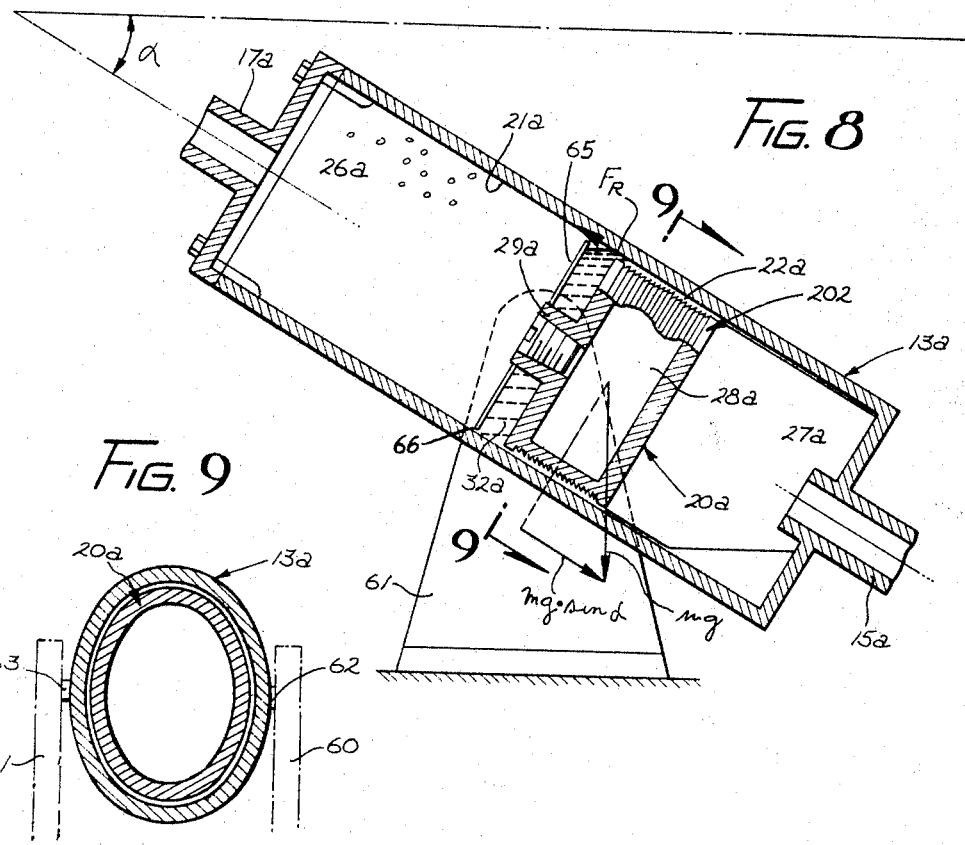
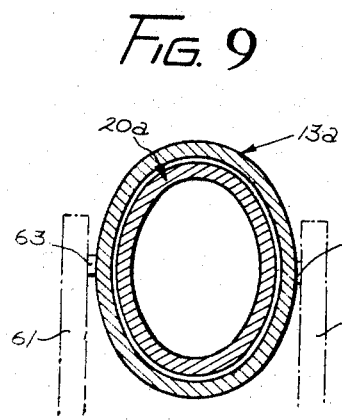
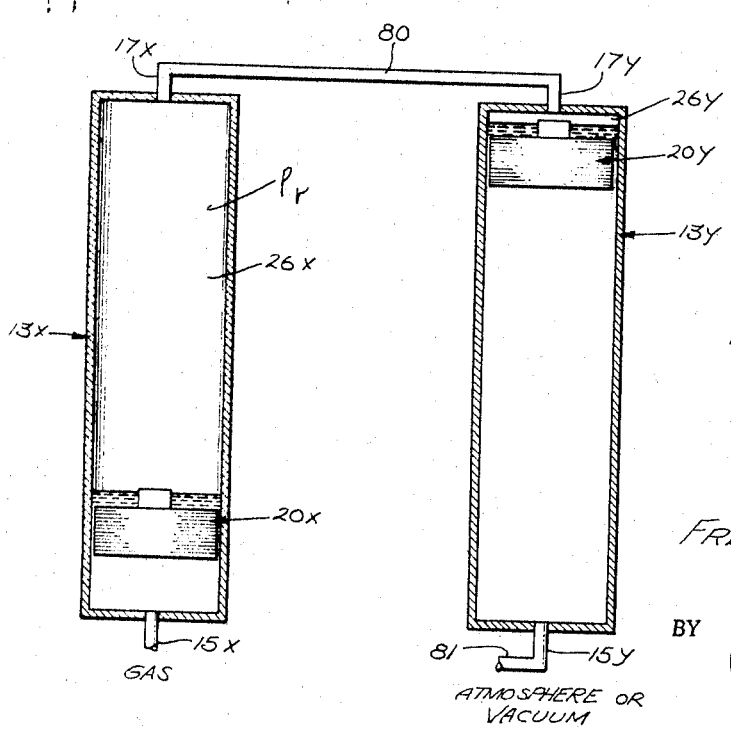
FREDERICK F. LIU
INVENTOR.
BY R. E. Giauque
ATTORNEY United States Patent Office 3,442,135
Patented May 6, 1969

3,442,135
DEVICE FOR MEASUREMENT OF GAS
PROPERTIES AND GAS FLOW RATE
Frederick F. Liu, Northridge, Calif., assignor to
Quantum Dynamics, Inc., Tarzana, Calif., a corporation of California
Filed Feb. 9, 1967, Ser. No. 614,961
Int. Cl. G01l 7/16
U.S. Cl. 73—419          11 Claims

ABSTRACT OF THE DISCLOSURE

Piston and casing combination having a capillary channel therebetween with the wall of the piston facing the channel containing a labyrinth. The casing contains a passage for connecting a gas source to one side of the piston, and a reservoir for sealing fluid is located on the other side of the piston and connected with the channel. The head of the fluid in the reservoir is adjustable to approximately balance the gas pressure on the opposite side of the piston. The casing can be tilted to produce gravitation forces on the piston compensating for frictional forces and the casing can be evacuated by a vacuum pump or compensating cylinder so that the piston is sensitive to leakages from a low pressure source into a substantial vacuum such as space.

This invention relates to a device for the measurement of gas properties and gas flow rate, and more particularly to a high-sensitivity, damped, liquid-seal piston which is retained within a casing or cylinder to which the gas is introduced.

The device of the present invention can be utilized to measure very slow gas leakage from a pressure source and can also be utilized to measure the pressure differential across an orifice to provide an indication of flow rate through the orifice. When the device is utilized to measure a gas leakage rate, the pressure source is connected to one side of the piston which is contained within a casing or cylinder of known dimension, and the piston moves within the cylinder at a rate which is proportional to the gas leakage.

Therefore, the time required for the piston to move from one selected location to another selected location in the cylinder provides an indication of flow leakage rate. The location of the piston within the cylinder can be determined in any well known manner such as by a magnetic pickup sensitive to a magnet carried by the piston or by an external photoelectric device responsive to viewing the piston. In the case where the device is utilized to measure flow through an orifice, the opposite sides of the piston can be connected to opposite sides of the orifice and the pressure differential on the piston will move the piston within the cylinder at a rate which is proportional to the pressure differential across the orifice so that the time required for a given piston movement is an indication of flow through the orifice.

In order to obtain an accurate measurement with the device of the present invention, a very effective liquid seal is provided between the piston and its casing or cylinder so that none of the gas can leak past the piston. The seal comprises a capillary channel between the casing and piston and containing a thin sheet of viscous fluid. The surface of the piston facing the channel has a multiplicity of labyrinth and the capillary fluid in the channel bordering the labyrinth centers the piston. A reservoir of fluid is provided on the top of the piston which serves the purpose of replenishing any fluid lost from the channel and also serves as a means for adjusting the weight of the piston so that the gas leakage from different pressure sources can be measured by the same piston. Thus, the measurement of the leakage flow rate of the gas can be conducted at various pressure levels, instead of confining such operation to a single pressure level. During movement of the piston, the liquid in the channel has a vortex action caused by multiplicity of labyrinth so as to sustain efficient sealing and so that damping of the piston results during its movement.

The present device has the advantage that a vacuum can be pulled on the backside of the piston in order to measure very small gas leakages which occur into a vacuum condition, such as outer space. Also, the device is particularly suited to the compensation of the frictional force on the piston produced by the seal by tilting the cylinder and using a certain gravity component of the tilted piston. The entire cylinder and piston assembly can be tilted by a critical amount so that the gravity component of the piston weight nearly balances out the frictional force between the piston and the liquid channel. Therefore, a small amount of pressure or flow is able to initiate the motion of the piston.

A prior device for sealing the mating surfaces of a round piston and its confining cylinder is disclosed in U.S. Patent No. 2,927,829 to G. K. Porter. In this device, a mercury ring seal is used to seal between the piston and its confining cylinder. The mercury ring reduces the friction but requires very small tolerance construction of both piston and cylinder. Such mercury seals are impractical when used under high pressure conditions since very small gaps are required in order to withstand pressures substantially above atmospheric. Also, such a mercury seal has the problem that the seal often breaks under the slightest irregularity of surface or pressure condition and further it is difficult to continuously replenish the leak mercury. Moreover, the mercury and its compounds are to a certain degree toxic and when oxidized, need frequent re-cleaning. Another difficulty of using a mercury ring type seal is that there is little possibility of applying damping to the moving piston. As a result, there can be a sticking and surging type of piston motion, particularly if the pressured gas does not have a steady flow rate. Moreover, the mercury ring type seal cannot be used with highly corrosive type gases, such as oxygen and fluorine, due to the strong tendency of oxidization of the mercury which tends to break down the sealing effect.

It is therefore an object of the present invention to provide a device for measurement of gas properties and gas flow rate which utilizes an effective liquid seal between the piston and its casing, said seal being effective when the device is connected to pressure sources of varying magnitude.

Another object of the invention is to provide a device for measurement of gas properties and gas flow rates in which the sidewall of the piston is spaced slightly from its casing to form a sealing channel and the sidewall has a labyrinth thereon serving to confine a thin layer of fluid within the channel, said fluid serving to center the piston while at the same time allowing highly sensitive movement of the piston with an amount of damping.

Another object of the present invention is to provide a device for measurement of gas properties and gas flow rate in which a viscous fluid is confined within a channel between the piston and its casing and the fluid is continually connected with a reservoir of fluid located on one surface of the piston, said fluid reservoir also serving to adjust the weight of the piston.

Another object of the invention is to provide a device for measuring gas properties and gas flow rates in which the piston and its container can be oriented vertically or tilted, and one side of the piston can be evacuated without interfering with the effectiveness of the seal between the piston and its confining member.

These and other objects of the invention not specifically set forth above will become readily apparent by the accompanying description and drawings in which:

FIGURE 5 is a perspective view of another form of the invention in which the space above the piston is evacuated to increase the sensitivity of the device to low gas pressures;

FIGURE 6 is a vertical section along line 6—6 of vacuum pump for evacuating the space in the cylinder; FIGURE 5 illustrating the Cartesian monostat and FIGURE 7 is a horizontal section along line 7—7 of FIGURE 6 illustrating the square configuration of the piston and confining casing;

FIGURE 8 is a sectional view of a device similar to that of FIGURE 1 which is tilted so as to utilize the downward gravity component of the piston's weight for counterbalancing or reducing friction force during movement of the piston;

FIGURE 9 is a section along line 9—9 of FIGURE 8 showing the oval configuration of the piston and casing; and FIGURE 10 is a sectional view of two devices of the present invention connected together at the top of the two pistons in order to provide a constant rarefied low pressure in the space above the pistons.

Figure 1:
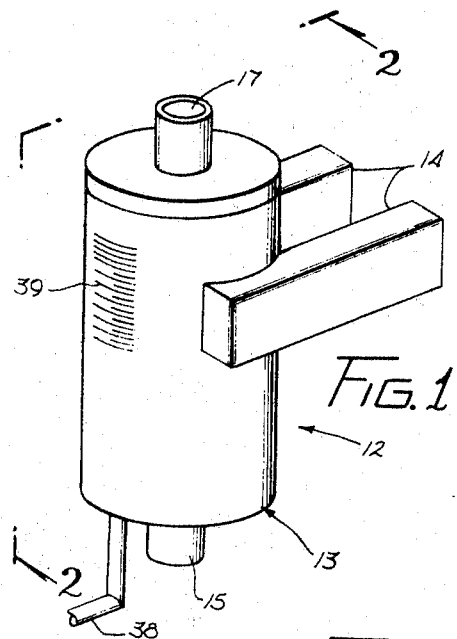
FIGURE 1 is a perspective view of the outer casing of the device of the present invention showing one side of the casing connected to a gas source and the other side of the casing open to atmosphere.

Referring to the embodiment of the invention shown in FIGURES 1 through 4, the device 12 has an outer casing 13 which is cylindrical in form and is supported in fixed position by a pair of arms 14 attached to any suitable supporting member. The gas whose properties or flow rate is to be measured is introduced to one end of the casing 13 through passage 15 and the other end of the casing above the piston can be connected to atmosphere through passage 17. A piston 20 is located within the casing 13 and is separated from the inner surface 21 of the casing by a channel 22. The surface of the piston opposite the channel 22 has flat end portions 23 and 24 at the top and bottom, respectively, and in between the flat surfaces, contains a number of labyrinth 35 comprising axially spaced annular ribs separated by depression in the surface of the piston (see FIGURE 3). The space 26 above the piston 20 is connected to atmosphere through passage 17 while the space 27 below the piston is connected to the gas source through the passage 15.

The piston 20 is illustrated as having a hollow cavity 28 and having a top tubular projection 29 which is closed by a plug 30. A supply of viscous sealing fluid 32 is retained on the top surface 31 of the piston in communication with the channel 22 in order to maintain a thin layer of viscous fluid in the channel, the fluid being designated 34. Any suitable sealing fluid can be used, such as a dimethylpolysiloxane available as Dow Corning 200 Fluid. The fluid head of the reservoir can be measured by its height on projection 29 and the effective weight of the piston can be varied by the addition of weight into cavity 28. By utilizing the cavity, a large labyrinth surface can be provided on a light weight piston.

The piston 20 moves within the casing 13 in response to the flow or pressure of the gas being introduced through passage 15. When properly balanced, the piston 20 is virtually suspended by the gas and it is separated in a non-contacting manner from the wall 21 by the capillary channel 22 surrounding the piston. The thin sheet of fluid 34 in the channel 22 has centering effect caused by the labyrinth surface of the piston. The specific weight of the piston 20 is determined by (a) $W_{20}$—the weight of the material of which the piston is made
(b) $W_{28}$—the weight of the gas in the cavity 28 and
(c) $W_{32}$—the weight of the sealing fluid 32 in the reservoir and the capillary space.

Thus, the equivalent specific weight ($\rho$) of the combination is equal to $$(W_{20}+W_{28}+W_{32})/V$$

where V is the volume of these three components. Because of these weight components, the counteracting pressure generated in the gas contained within the space 27 which is given by $$P_{27}=(W_{20}+W_{28}+W_{32})/A$$

where A is the cross sectional area of the casing wall 21.

Figure 2:
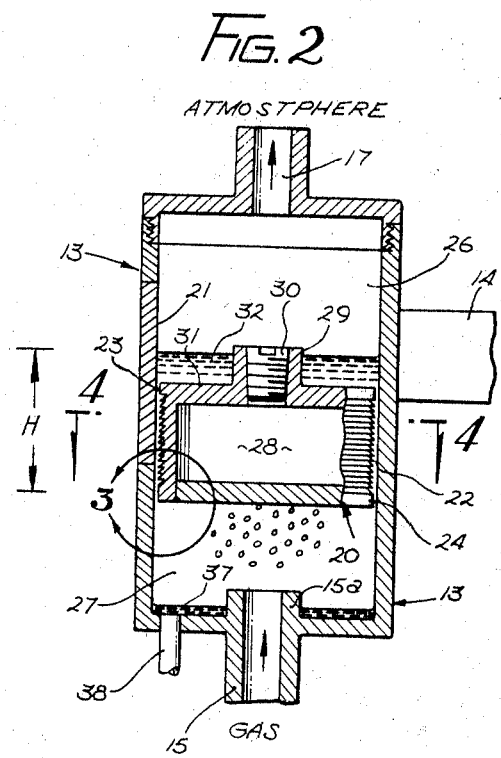
FIGURE 2 is a vertical section along line 2—2 of FIGURE 1 illustrating the sealing fluid reservoir on top of the piston.
Figure 3:
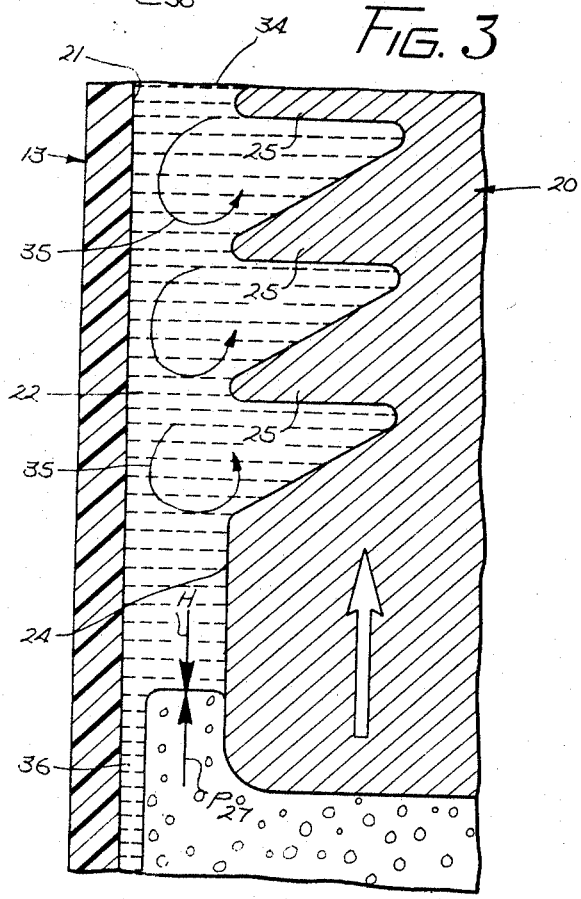
FIGURE 3 is an enlarged partial section of locations 3 indicated in FIGURE 2.
Figure 4:
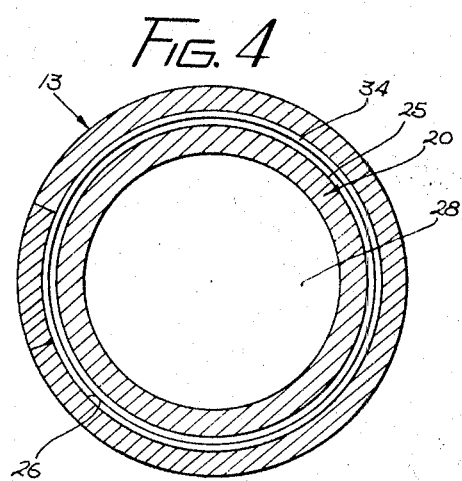
FIGURE 4 is a horizontal section along line 4—4 of FIGURE 2 showing the cylinder and the piston with the sealing fluid therebetween.

To achieve the optimum sealing effectiveness, the pressure $P_{27}$ is to be balanced by the pressure head H of the sealing fluid 32 (see FIGURE 2). By adjusting the head H of the fluid 32, the desired balancing condition can be achieved, namely, $$P_{27}=H; \ P_{27}=W_{20}+W_{28}+W_{32}/A$$

For the condition where $P_{27}$ is less than H, an excessive amount of fluid may leak down the capillary space 22. For the condition where $P_{27}$ is greater than H, gas bubbles may rise in the capillary fluid sheet 34 and cause motional instability. If the balance between $P_{27}$ and H is approximately achieved, the seal can be leak tight and no gas can escape past the piston 20.

When the piston moves within the casing 30 in response to the introduction of gas into the space 27, as in the case of measuring the mass and/or volumetric flow of the gas, the labyrinth surrounding the piston causes a vortex motion in the capillary fluid 34, the effect of which is analogous to the creation of a multiplicity of fluid rollers 35 supporting and centering the piston. At the same time, the votex motion exerts a degree of damping to piston motion in order to achieve steady piston motion and the degree of damping can be adjusted by means of adjusting the viscosity of fluid sheet 34. Normally, the equation of motion of the piston is expressed by a second order differential equation $$F(t)=m(d^2x/dt^2)+c(dx/dt)+kx$$

where $F(t)$ is the driving function; $x$ is the displacement, and its first and second differentials are respectively the velocity and acceleration; $m$ is the mass of the moving part, namely, the piston, and $c$ is the damping factor; $k$ is the elastic restraint force. For a damped motional system, the amount of damping increases with velocity. Since the mass of the moving part, e.g. the piston, is appreciable; the inertial term caused by acceleration is often detrimental to steady measurement and results in instabilities. Thus, the fluid sheet in the channel 22 has a damping force which can be adjusted by adjusting of viscosity of the fluid and at the same time serves as the gas seal. In prior devices using the mercury ring seal, the seal neither exerts a damping force or is there any damping force whatsoever that can be adjusted.

It is understood that the casing 13 need not be round or cylindrical since it can be elliptical, square, rectangular or any other shape. Also, the casing and/or piston can be made of metal, glass, plastic or other suitable materials. With the pressure $P_{27}$ and the head H substantially balanced, a small amount of fluid 34 may leak down the channel wall 21 to the bottom of the casing 13. The end 15a of the passage 15 projects into the casing 13 to provide a reservoir 37 for the leaking fluid and this fluid can be removed through passage 38 in the bottom of the casing 13. It is also understood that the casing 13 can be transparent so that the position of the piston as it moves within the casing can be observed and that lines 39 can be placed on the exterior of the piston to indicate when the piston has moved through a known volume within the cylinder.

Referring to the embodiment of the invention illustrated in FIGURES 5-7, similar reference numerals are used with primes to indicate parts similar to those of the prior embodiment. This embodiment is particularly suited to measurement of low pressure leak flow rates of gas such as might occur from space vehicles to space. Piston 20′ is located within casing 13′ and, as illustrated in FIGURE 7, both the casing and the piston have a square configuration. Piston 20′ divides the casing chamber into spaces 26′ and 27′. The side of the piston 20′ which faces the casing wall 21′ comprises flat portions of 23′ and 24′ between which are located a plurality of labyrinth portions 25′. The piston is separated from the internal casing surface 21′ by the capillary channel 22′ which contains the sealing fluid 34′ supplied from the fluid reservoir 32′ maintained on the top surface 31′ of the piston 20′. The internal cavity 28′ of the piston is closed by the plug 30′ contained within the casing extension 29′.

The internal casing wall 21′ terminates in a substantially conical shaped end chamber 42 which provides the reservoir 37′ leading to fluid return passage 38′ which contains a valve 43 and a pump 44. Gas from the pressure source is introduced into the chamber end 42 through the passage 15′ from the gas source and the passage has a valve 45. The opposite end of the casing wall 13′ terminates in a substantially conical shaped end chamber 46 to which the passage 38′ returns the leakage fluid from the lower reservoir 37′ when the valve 43 is opened and the pump 44 is operating. As in the prior embodiment, the head H of the fluid reservoir 32′ is approximately balanced against the pressure $P_{27'}$ in chamber 27′ and the sealing and damping action of the fluid 34′ in the capillary channel 22′ is the same as in the prior embodiment.

The top of end chamber 46 connects with a passage 47 leading to an adjustable Cartesian monostat 49 which is in turn connected by passage 51 with the vacuum pump 50. The vacuum pump and monostat can maintain a constant low pressure in the space 26′ which is less than one atmosphere. The lower space 27′ can also be connected to the monostat 49 by a passage 52 containing a valve 53 so that a similar low constant pressure may be produced in the chamber 27′. With the valve 45 of the gas line 15′ closed, the operation of pump 50 can draw a low constant pressure in the spaces 26′ and 27′. Thereafter, the valve 53 can be closed and the valve 45 can then be opened to connect low pressure space 27′ with a low pressure source which can leak to the chamber 27′. By continuously evacuating the upper chamber 26′, a part or the entirety of the piston weight, plus motional friction force, can be counterbalanced or taken off. This not only increases the sensitivity of the piston in response to the gas, but substantially reduces the inertial term of the motion equation set forth above. In other words, the mass "m" in the equation can be reduced to a very small value and the inertial term also becomes small. By adjusting the head H, by increasing or decreasing the liquid level of reservoir 32′, the condition of $P_{27'}$ approximately equal to H can still be maintained. By pulling a vacuum of constant and known back pressure below atmospheric pressure on the upper side of the piston, the measurement and calibration of the flow rate at very low pressures can be accurately obtained, such as the measurement of the leak rate of minute amounts of gases from the space vehicle to space. By utilizing a pressure differential between the chamber 27′ containing the flowing gas from the upper chamber 26′, a large part or even the complete amount of the piston weight and the friction force can be taken off or counterbalanced, thus permitting highly sensitive movement of the piston in response to the flow of the very low pressure gas. Such a measurement process more closely simulates space conditions, such as zero g, and leakage to complete, or partial, vacuum. The measurement of the displacement of the piston 20′ can be accomplished in the same manner and by the same apparatus as discussed in connection with the first embodiment and the complete casing 13′ can be rigidly supported by arms 14′.

Referring to the embodiments of FIGURES 8 and 9, parts similar to those of the first embodiment are designated by similar reference numerals accompanied with the letter "a." The casing 13a can be oval in cross section as indicated in FIGURE 9 and can be supported by a pair of stanchions 60 and 61 which pivotally mount extensions 62 and 63 from casing 13a so that the casing can be tilted and held at any desired angle "α" to the horizontal. The angle α is selected such that with a little additional downward tilting, the piston 20a would slide downward toward the inlet 15a. In this position, the gravity component of the piston weight $mg$ along the axial direction of the casing 13a is $mg.\sin α$ and this component can be selected to approximately equal the sliding friction of the piston $F_r$ or, it can be smaller so as to offset a major part of the frictional force. Therefore, the tilted condition of the casing is conductive to sensitive response to the gas flow once it is admitted to the chamber 27a. Thus, a small amount of pressure or flow is able to initiate motion of the piston and only a small amount of driving force is required to overcome the residual amount of weight and/or frictional force. A plate 65 can be attached to the extension 29a and a small capillary gap 66 exists between the casing wall 21a and the edge of the plate so that the sealing fluid is retained within the reservoir 32a.

In the modification of FIGURE 10, the evacuation or rarefication process of reducing the pressure above the piston and thus counterbalancing the friction and weight of the piston, can be accomplished without the use of a vacuum pump. This embodiment, two casings 13x and 13y and two pistons 20x and 20y can each be of the same configurtion as the casing and piston of the first embodiment. The top passages 17x and 17y are connected together by passage 80 and the bottom passage 15x is connected to the gas source while bottom passage 15y is connected to a passage 81 leading to atmosphere or vacuum. When the piston 20y is kept at a raised position as illustrated in FIGURE 10, it has a tendency to lower itself due to the effect of gravity. In this condition, the space 26y above the piston 20y is continually connected to the space 26x above piston 20x through passage 80 and the spaces are rarefied to a degree that eventually prevents piston 20y from further moving downward. A state of constant rarefied low pressure $P_r$ then prevails in the spaces 26x and 26y above the pistons 20x and 20y, respectively. Thus, there is a counterbalancing force acting on piston 20x in the upper direction which serves the same purpose as the vacuum pump and monostat of the second embodiment. The degree of low pressure $P_r$ can be adjusted by using different weights of pistons 20x and 20y.

When the gas flow is admitted to passage 15x below piston 20x, the integrated pressure forces of the admitted gas plus integrated pressure force above piston 20x due to rarefaction serve to raise piston 20x at a rate corresponding to the flow rate of the incoming gas. As piston 20x moves upwardly, piston 20y moves downwardly and is balanced by the pressure above it. Therefore, the highly sensitive response of piston 20x to the inflowing gas is achieved.

By the present invention there is provided a device incorporating a fluid seal which is entrapped. The entrapment is caused by the balance between the fluid head and the pressure of the gas and by the effect of the labyrinth of grooved configuration. In this manner, the leakage of the sealing fluid is kept to a bare minimum insuring long term entrapment of the sealing fluid. Also, the invention provides means for the evacuation or rarefication of the atmosphere acting on the piston by either the vacuum pump and monostat or through a compensating cylinder and piston arrangement. It is understood that any suitable fluid can be used for the sealing film and that various types of vacuum pumps can be utilized for evacuation of the casing. Also, the cavity in the piston can be filled with a gas, liquid or solid to increase the weight thereof.

What is claimed is:

1. In combination:
   a casing containing a bore;
   a piston movable axially in said casing bore;
   said casing bore and piston having confronting axial sealing surfaces, the sealing surface of said piston being slightly smaller in transverse cross section than the sealing surface of said casing bore, whereby an annular, radially narrow capillary channel exists between said sealing surfaces;
   means for introducing a gas at a source pressure to said casing on one side of said piston; and
   a supply of liquid sealing fluid connected with said channel and carried by said piston above said channel and on the other side of said piston, the surface of said piston having at least a portion thereof comprising a labyrinth formed by depressions in said surface portion, said channel being continuous over the full axial length of said piston whereby substantial entrapment of said fluid occurs in said channel to produce within said channel a thin sheet of sealing fluid providing the only seal between said casing and piston.

2. The combination according to claim 1 wherein said sealing fluid supply comprises a reservoir on said other side of said piston communicating with said capillary channel and containing a body of said sealing fluid.

3. The combination according to claim 1 wherein said casing is positioned with its longitudinal axis inclined relative to a horizontal plane by an angle less than the angle at which the piston would be moved down the casing bore by gravity, thereby compensating for frictional force between said piston and said bore.

4. The combination according to claim 1 having means for removing from said casing the sealing fluid which leaks past said channel.

5. The combination according to claim 1 having a projection on said other side of said piston surrounded by said sealing fluid and providing an indication of said pressure head of said fluid.

6. The combination according to claim 1 wherein said piston contains a cavity for receiving material to adjust the weight of said piston.

7. The combination according to claim 1 wherein said labyrinth induces the formation of vortices in said sealing fluid in said channel, thereby to produce a vortex sheet between said sealing surfaces.

8. The combination according to claim 7 wherein said labyrinth comprises a number of extending, axially spaced alternate arcuate ribs and grooves axially spaced, annular ribs separated from one another by one of said depressions.

9. A transducer according to claim 1 wherein the combined weight of said piston and the sealing fluid produces an effective gravitational force which substantially equalizes the source pressure of said gas, said piston tending to assume a position of stable equilibrium within said cylinder bore wherein said forces are balanced.

10. The combination according to claim 1 having means for evacuating said casing bore on said other side of said piston to a selectively variable sub-atmospheric level to counterbalance piston weight and friction.

11. The combination according to claim 10 wherein said evacuating means comprises a second compensating piston and casing of substantially the same structure as said first mentioned piston and casing, the spaces above said first and second pistons being connected together, with the space below the first piston connected to said gas source and the space below said second piston connected to an evacuation source, said second piston being normally higher than said first piston prior to introducing gas to said space below said first piston.

References Cited

UNITED STATES PATENTS

| 265,229 | 9/1882 | Hyatt | 138—31 |
| 2,411,229 | 11/1946 | Pratt | 92—174 |
| 2,927,829 | 3/1960 | Porter | 277—135 |

OTHER REFERENCES

A Tilting Air-Lubricated Piston Gage for Pressures Below One-Half Inch of Mercury by U. O. Hutton an article in The Journal of Research of the National Bureau of Standards, vol. 63c, No. 1, July–September 1959; pages 47, 48, 49 and 57.

LOUIS R. PRINCE, Primary Examiner.

D. E. CORR, Assistant Examiner.